(12) United States Patent
Haga

(10) Patent No.: US 6,618,188 B2
(45) Date of Patent: Sep. 9, 2003

(54) REWRITABLE DISPLAY SHEET, IMAGE FORMING APPARATUS FOR DISPLAYING IMAGE ON REWRITABLE DISPLAY SHEET, AND IMAGE DISPLAYING METHOD

(75) Inventor: Masayasu Haga, Aichi-ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/097,273

(22) Filed: Mar. 15, 2002

(65) Prior Publication Data

US 2002/0135859 A1 Sep. 26, 2002

(30) Foreign Application Priority Data

Mar. 23, 2001 (JP) ......................................... 2001-084899

(51) Int. Cl.[7] .......................... G02B 26/00; G09G 3/34; G09G 3/38
(52) U.S. Cl. ........................ 359/296; 345/107; 345/105
(58) Field of Search ................................ 359/296, 452, 359/253, 238, 240; 345/107, 105, 108, 84, 111; 204/450, 485, 600, 490; 349/2

(56) References Cited

U.S. PATENT DOCUMENTS

| 4,203,106 A | 5/1980 | Dalisa et al. |
|---|---|---|
| 4,272,596 A | 6/1981 | Harbour et al. |
| 4,305,807 A | 12/1981 | Somlyody |
| 4,648,956 A | 3/1987 | Marshall et al. |
| 4,680,103 A | 7/1987 | Beilin Solomon I. et al. |
| 5,053,763 A | 10/1991 | DiSanto et al. |
| 5,174,882 A | 12/1992 | DiSanto et al. |
| 5,302,235 A | 4/1994 | DiSanto et al. |
| 5,460,688 A | 10/1995 | DiSanto et al. |

FOREIGN PATENT DOCUMENTS

| JP | A-10-062824 | 3/1998 |
|---|---|---|
| JP | A-10-090732 | 4/1998 |
| JP | A-10-149118 | 6/1998 |

*Primary Examiner*—David N. Spector
*Assistant Examiner*—Jack Dinh
(74) *Attorney, Agent, or Firm*—Burns, Doane, Swecker & Mathis, LLP

(57) ABSTRACT

Provided is a rewritable display sheet capable of displaying different images on both surfaces. The rewritable display sheet 10 of the present invention is provided with a conductive substrate 12 that has a voltage applying section 12a at an end portion, transparent sheets 14 and 16 provided on both sides of the conductive substrate 12, and display layers 18 and 20 which are provided between the conductive substrate 12 and the transparent sheets 14 and 16 and in which an image is written with an electric field applied.

20 Claims, 7 Drawing Sheets

REWRITABLE DISPLAY SHEET, IMAGE FORMING APPARATUS FOR DISPLAYING IMAGE ON REWRITABLE DISPLAY SHEET, AND IMAGE DISPLAYING METHOD

RELATED APPLICATION

This application is based on Japanese Patent Application No. 2001-84899, the content of which is incorporated herein by reference.

BACKGROUND OF THE INVENTION

The present invention relates to a rewritable display sheet for rewritably displaying an image by utilizing, for example, an electrophoretic phenomenon.

Conventionally, image display devices utilizing the electrophoretic phenomena are disclosed in, for example, Japanese Patent Laid-Open Publication Nos. HEI 10-62824, HEI 10-90732 and HEI 10-149118.

However, the image display devices disclosed in these documents and the other well-known electrophoretic display devices all display an image only on one surface, and there has existed no electrophoretic display device that can display different images on both surfaces.

SUMMARY OF THE INVENTION

Accordingly, the object of the present invention is to provide a rewritable display sheet capable of displaying images on both surfaces, an image forming apparatus for writing images on the rewritable display sheet, and an image displaying method for displaying images on the rewritable display sheet.

In order to achieve the aforementioned object, the rewritable display sheet of the present invention is provided with a conductive substrate having a voltage applying section at an end portion, a first display layer, which is provided on a first surface of the conductive substrate and able to display a first image with a first electric field applied thereto, a first transparent sheet provided on the first display layer, a second display layer, which is provided on a second surface of the conductive substrate and able to display a second image with a second electric field applied thereto, and a second transparent sheet provided on the second display layer.

Moreover, an image forming apparatus of the present invention is provided with an image writing member provided so as to be able to come in contact with the surface of the first transparent sheet of the rewritable display sheet, and a voltage applying member provided so as to be able to come in contact with the voltage applying section of the rewritable display sheet.

Moreover, an image displaying method of the present invention includes the step of, in a state in which a first voltage is applied to a voltage applying section of the rewritable display sheet, applying a second voltage to the surface of the first transparent sheet according to an image signal, whereby an image is displayed on the first display layer.

In the rewritable display sheet of the present invention, the image writing is performed in a state in which a first voltage is applied to the voltage applying section of the conductive substrate. The image writing is performed by putting an electrode to which a second voltage is applied in contact with or close to the surface of the first transparent sheet according to, for example, an image signal. When the second voltage is applied to the above-mentioned electrode, an electric field is formed between the conductive substrate and the electrode due to a potential difference between the first voltage and the second voltage. Therefore, an image is written into the first display layer by the effect of this electric field, and consequently, the image is displayed on one surface of the rewritable display sheet.

Also, when an image is written into the other surface of the rewritable display sheet on the one surface of which the image has been displayed as described above, an image is written into the second display layer by putting an electrode to which the third voltage, which may be identical with the second voltage, is applied in contact with or close to the surface of the second transparent sheet according to, for example, an image signal to form an electric field between the conductive substrate and the electrode in a state in which the first voltage is applied to the conductive substrate via the voltage applying section. In this case, if a member of the same potential as that of the conductive substrate is put in contact with the surface on which the image has already been displayed, i.e., the entire surface or part of the first transparent sheet when the image is written into the second display layer of the rewritable display sheet, then no electric field is formed between the conductive substrate and the above-mentioned member. As a result, the image written in the first display layer is not disordered but kept intact.

As described above, according to the rewritable display sheet of the present invention, different images can be displayed on both surfaces.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
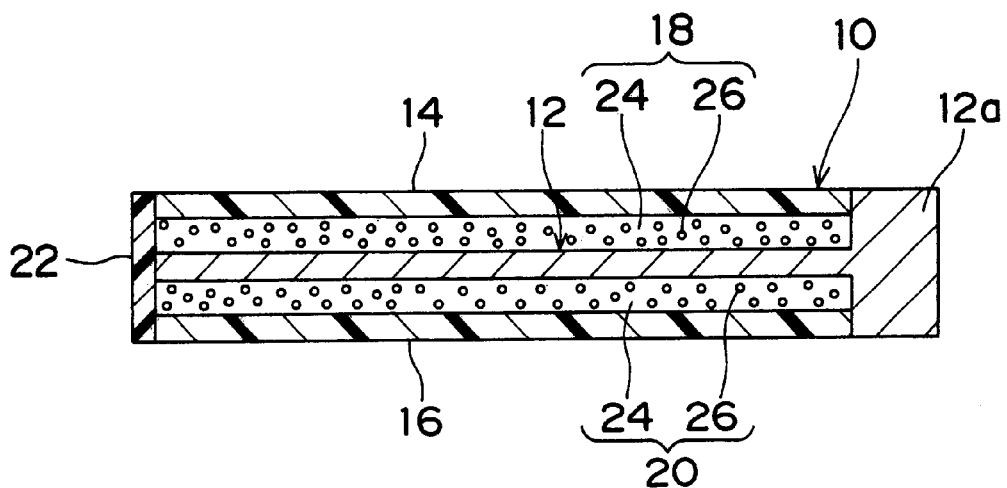
FIG. 1 is a sectional view of the electrophoretic display sheet of one embodiment, showing a sectional view taken along the line A—A of FIG. 2.
Figure 2:
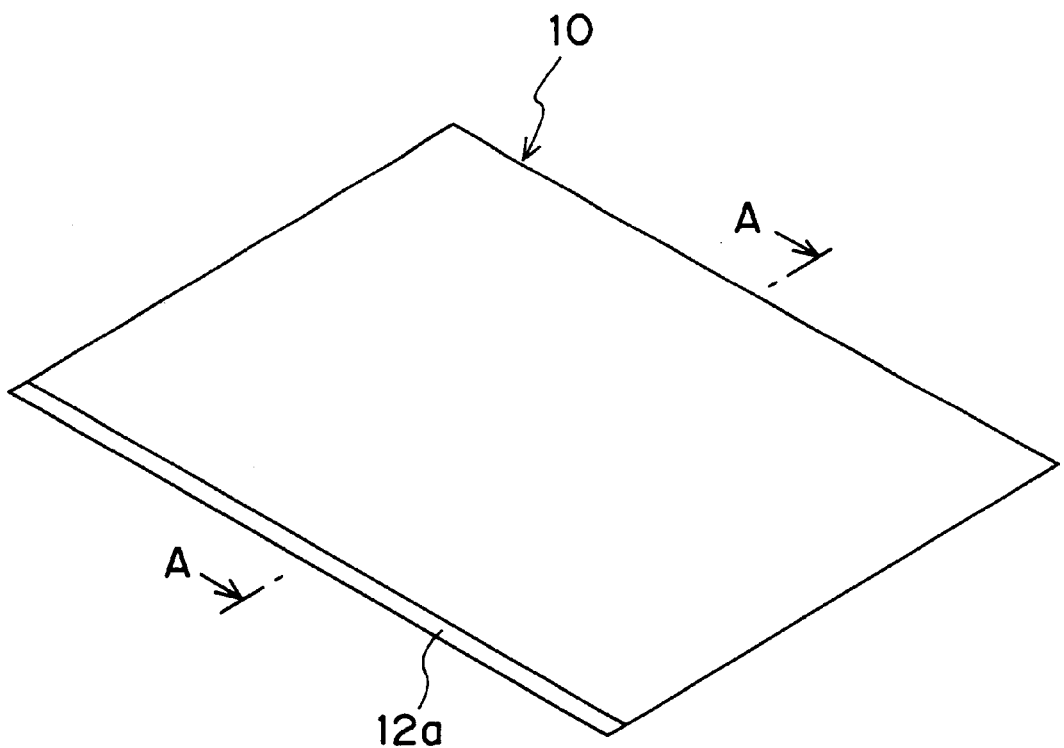
FIG. 2 is an overall perspective view of the electrophoretic display sheet.

FIGS. 1 and 2 show an electrophoretic display sheet 10 which is the rewritable display sheet of the first embodiment.

FIG. 1 is a sectional view taken along the line A—A of FIG. 2, while FIG. 2 is an overall perspective view.

This electrophoretic display sheet 10 is provided with a conductive substrate 12 made of, for example, a metal, first and second transparent sheets 14 and 16 constructed of, for example, resin films provided on both sides of the conductive substrate 12, and first and second electrophoretic layers (display layers) 18 and 20 provided between the conductive substrate 12 and the transparent sheets 14 and 16, respectively. One end portion of the conductive substrate 12 projects from the transparent sheets 14 and 16 while being exposed, and this portion serves as a voltage applying section 12a. The three peripheral side portions of the electrophoretic display sheet 10 except for the voltage applying section 12a are sealed by the respective side walls 22 each being constructed of, for example, a resin film strip. The side portions of the electrophoretic layers 18 and 20 are sealed by these side walls 22 and the voltage applying section 12a of the conductive substrate 12. It is to be noted that the electrophoretic layers 18 and 20 may be partitioned or divided into cells or capsules by partition walls.

The electrophoretic layers 18 and 20 are constructed of a dispersion medium 24 composed of an insulating organic solvent colored in, for example, black and electrophoretic particles 26 composed of, for example, white pigment particles dispersed in this dispersion medium 24. The electrophoretic particles 26 are electrically charged particles with either positive or negative polarity and assumed to be charged with the negative polarity in this case.

Figure 3:
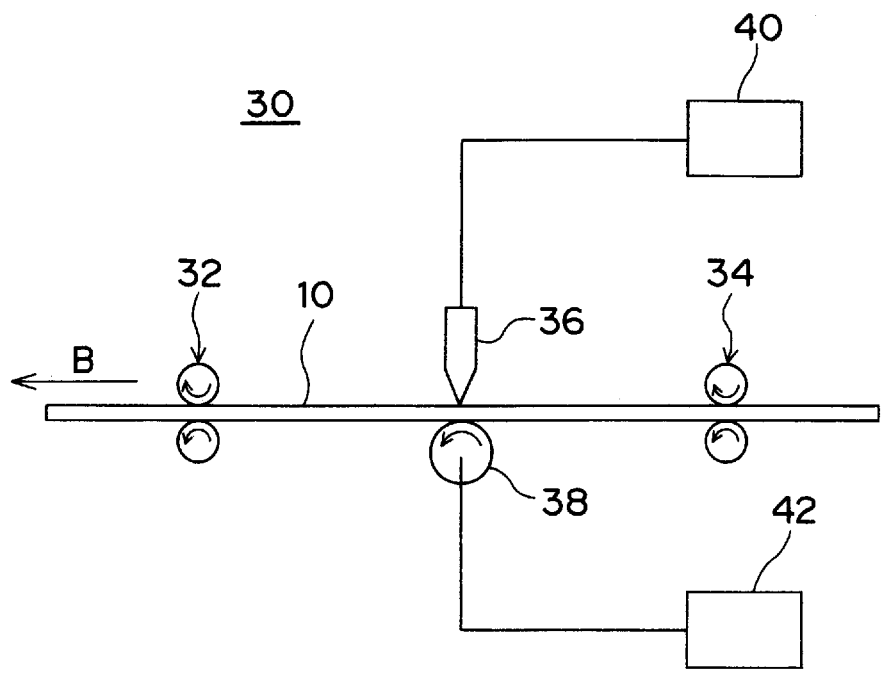
FIG. 3 is a schematic structural view of an image forming apparatus.

Image writing into the electrophoretic display sheet 10 that has the above-mentioned construction is performed by means of an image forming apparatus 30 as shown in FIG. 3. This image forming apparatus 30 is provided with a recording head (image writing member) 36 that comes in contact with the surface of the transparent sheet 14 or 16 of the electrophoretic display sheet 10 conveyed in the direction of arrow B by conveyance rollers 32 and 34, and a conductive roller (voltage applying member) 38, which is arranged opposite to the recording head 36 and comes in contact with the back surface, i.e., the transparent sheet 16 or 14, and the voltage applying section 12a of the electrophoretic display sheet 10 being conveyed. It is to be noted that the voltage applying member is not limited to the roller-shaped one and is permitted to be a conductive plate member constructed of, for example, a metal plate. Moreover, the conductive roller 38 may have a length equal to or greater than the width in the direction perpendicular to the conveyance direction of the electrophoretic display sheet 10 or a length necessary and sufficient for applying a voltage to the voltage applying section 12a of the conductive substrate 12. Furthermore, the arrangement position of the conductive roller 38 is not necessarily opposed to the recording head 36.

The recording head 36 has a number of needle-shaped electrodes (not shown) arranged in the lengthwise direction (perpendicular to the plane of the sheet of FIG. 3) of the head at the tip portion that comes in contact with the electrophoretic display sheet 10. To the electrodes is applied a second voltage of, for example, the positive polarity by a power source 40 according to an image signal. On the other hand, to the conductive roller 38 is applied a first voltage of, for example, the negative polarity by a power source 42 at least in an image writing stage. It is to be noted that the conductive roller 38 should preferably be rotated in the direction of arrow at a peripheral velocity equal to the velocity of conveyance of the electrophoretic display sheet 10 but not necessarily be rotated.

Figure 4:
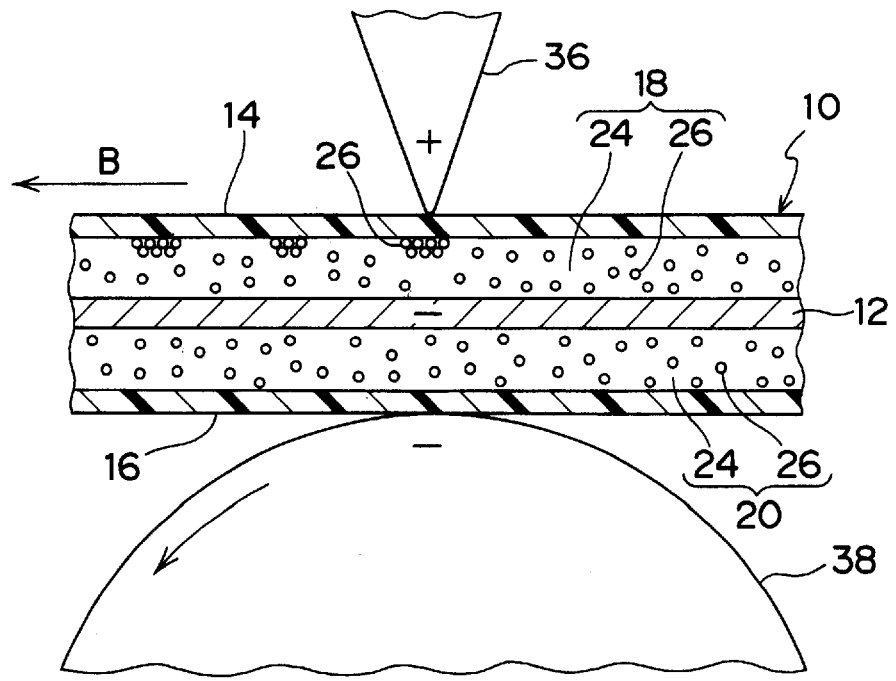
FIG. 4 is an enlarged view of the vicinity of a tip portion of a recording head in a state in which an image is written.
Figure 5:
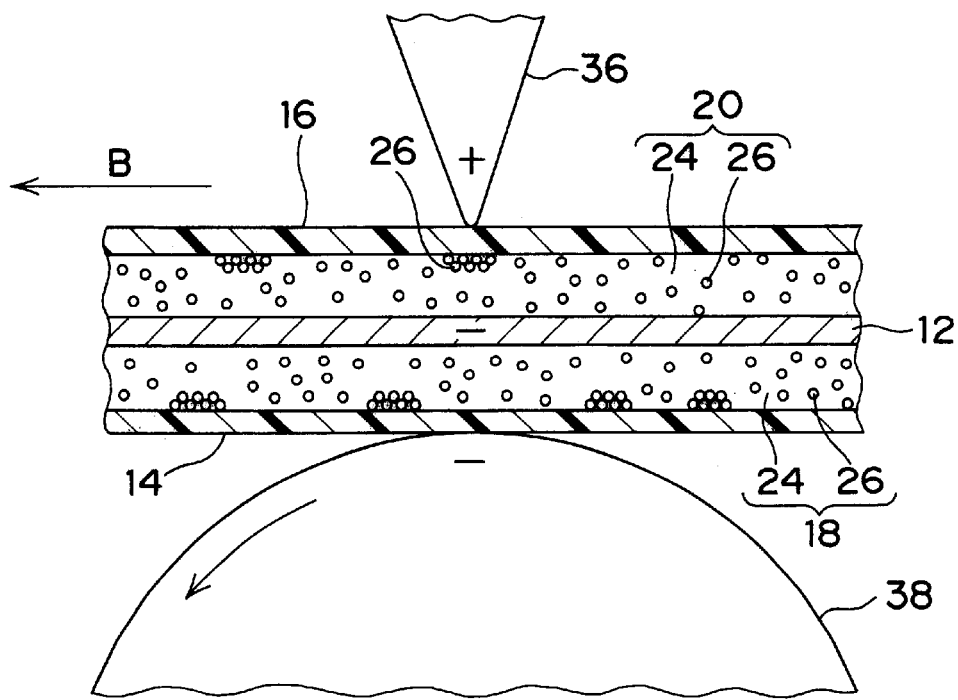
FIG. 5 is an enlarged view of the vicinity of a tip portion of a recording head in a state in which an image is written.

The image writing into the above-mentioned electrophoretic display sheet 10 by the image forming apparatus 30 will continuously be described. In the image writing stage, the electrophoretic display sheet 10 is conveyed in the direction of arrow B by the conveyance rollers 32 and 34. In this stage, the first voltage of, for example, the negative polarity is applied to the conductive roller 38 by the power source 42. This conductive roller 38 is brought in contact with the voltage applying section 12a of the conductive substrate 12 of the electrophoretic display sheet 10 being conveyed. Therefore, in the image writing stage, as shown in FIG. 4, the first voltage of the negative polarity is applied to the conductive substrate 12 throughout the entire surface of the electrophoretic display sheet 10.

On the other hand, the tip of the recording head 36 is brought in contact with the surface of the first sheet 14 of the electrophoretic display sheet 10 being conveyed. To the electrode at the tip of the recording head 36 is applied the second voltage of, for example, the positive polarity by the power source 40 according to the image signal. When the second voltage is applied, an electric field is formed between the recording head 36 and the conductive substrate 12 by a potential difference between the second voltage and the first voltage. By the effect of this electric field, the negatively charged electrophoretic particles 26 dispersed in the first electrophoretic layer 18 are attracted to the recording head 36 and clustered on the first sheet 14. When the electrophoretic display sheet 10 is viewed from the first sheet 14 side, this cluster forms a white dot. By the aggregate of numbers of white dots formed as described above, an image is displayed on the first sheet 14 side.

After the image writing on the first sheet 14 side is completed, the electrophoretic display sheet 10 is turned inside out and put again through the image forming apparatus 30 to execute image writing on the second sheet 16 side. The electrophoretic display sheet 10 is conveyed by the conveyance rollers 32 and 34 and passes again through the space between the recording head 36 and the conductive roller 38. At this time, the voltage applying section 12a of the conductive substrate 12 also comes in contact with the conductive roller 38, by which the first voltage of, for example, the negative polarity is applied to the conductive substrate 12 throughout the entire surface of the sheet. In this state, the third voltage of, for example, the positive polarity is applied to the electrode at the tip of the recording head 36 that comes in contact with the surface of the second sheet 16 by the power source 40 according to an image signal. It is to be noted that the third voltage may be different from or identical with the second voltage utilized for image writing on the first sheet 14 side. When the third voltage is applied, an electric field is formed between the recording head 36 and the conductive substrate 12 by a potential difference between the third voltage and the first voltage. By the effect of this electric field, the negatively charged electrophoretic particles 26 dispersed in the second electrophoretic layer 20 are attracted to the recording head 36 and clustered on the second sheet 16. When the electrophoretic display sheet 10 is viewed from the second sheet 16 side, this cluster forms a white dot. By the aggregate of numbers of white dots formed as described above, an image is displayed on the second sheet 16 side.

On the other hand, when the image writing is performed on the second sheet 16 side as described above, the conductive substrate 12 and the conductive roller 38 are both put in an equipotential state of the negative polarity. Therefore, no electric field is formed between the conductive substrate 12 and the conductive roller 38. For this reason, the electrophoretic particles 26 in the first electrophoretic layer 18 stay intact without electrophoresis. As a result, the previously written image on the first sheet 14 side is maintained without being disordered.

As described above, according to the electrophoretic display sheet 10 of the present embodiment, images can be concurrently displayed on both surfaces, and different images can also be displayed on both surfaces.

A variety of modification examples of the electrophoretic display sheet and the image forming apparatus will be described next.

Figure 6:
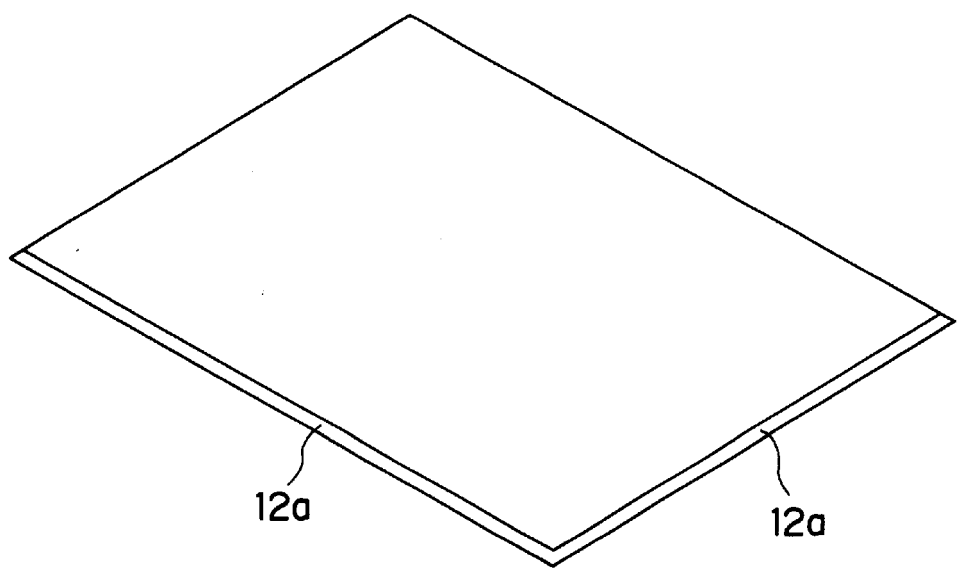
FIG. 6 is an overall perspective view showing a modification example of the electrophoretic display sheet.

The aforementioned electrophoretic display sheet 10 is formed in a manner that the voltage applying section 12a of the conductive substrate 12 projects from only one peripheral edge portion while being exposed. However, as shown in FIG. 6, the display sheet may be formed in a manner that the voltage applying section 12a of the conductive substrate 12 projects from two peripheral edge portions that are not parallel to each other, three peripheral edge portions or four peripheral edge portions, out of the four peripheral edge portions of the sheet while being exposed. By thus forming the voltage applying section 12a in at least two peripheral edge portions that are not parallel to each other, a voltage can be applied to the voltage applying section 12a of the conductive substrate 12 by the conductive roller 38 even when the image forming is performed by conveying the electrophoretic display sheet in either the longitudinal or transverse direction inside the image forming apparatus 10.

Figure 7:
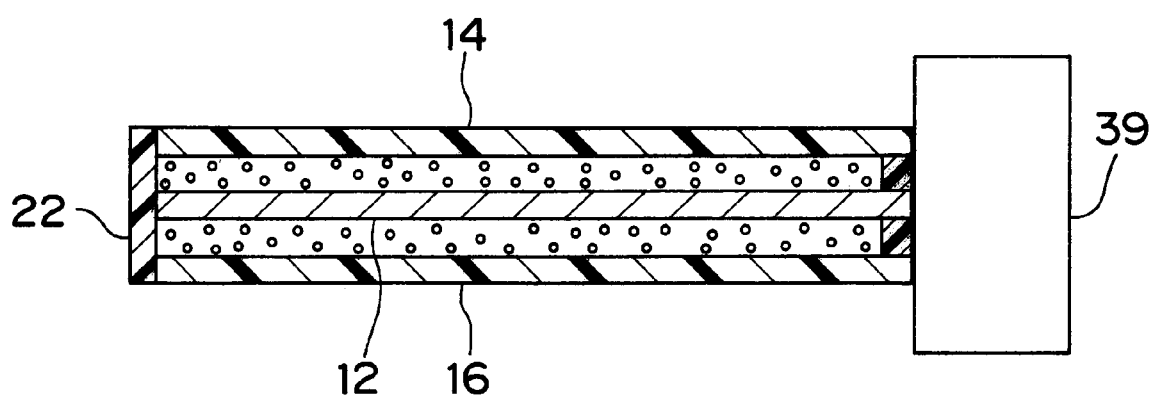
FIG. 7 is a sectional view showing another modification example of the electrophoretic display sheet.

Moreover, in the aforementioned electrophoretic display sheet 10, the voltage applying section 12a of the conductive substrate 12 projects from the first and second sheets 14 and 16 while being exposed. However, as shown in FIG. 7, the end portion of the conductive substrate 12 may be exposed to the end surface of the electrophoretic display sheet without projecting from the first and second sheets 14 and 16. In this case, a voltage applying member 39 for applying a voltage to the end portion of the conductive substrate 12 may be formed of a conductive brush, a conductive roller that has elasticity at least on its outer peripheral portion, an elastic plate-shaped member or the like.

Figure 8:
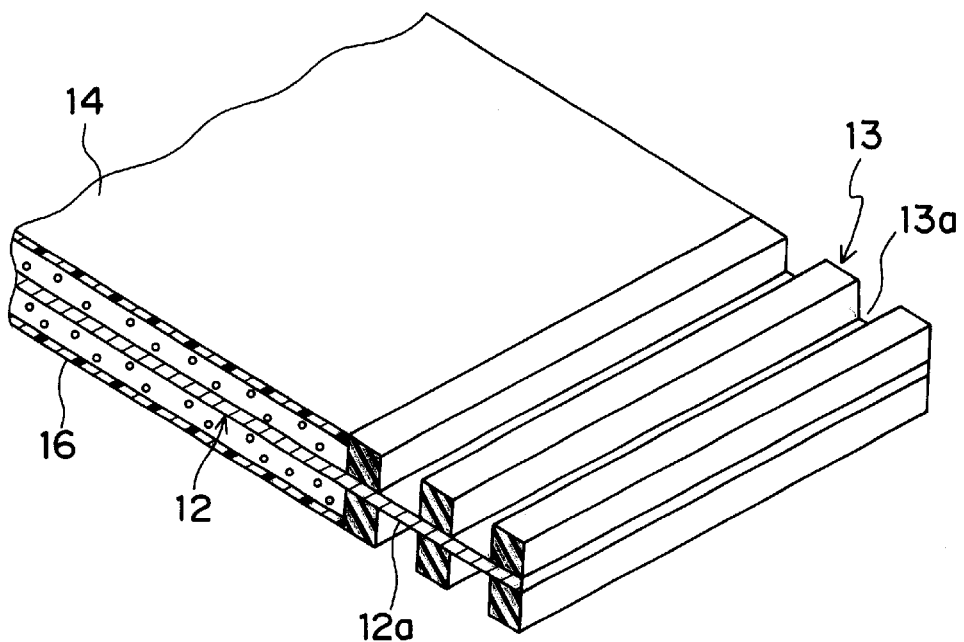
FIG. 8 is a partial perspective view showing yet another modification example of the electrophoretic display sheet.
Figure 9:
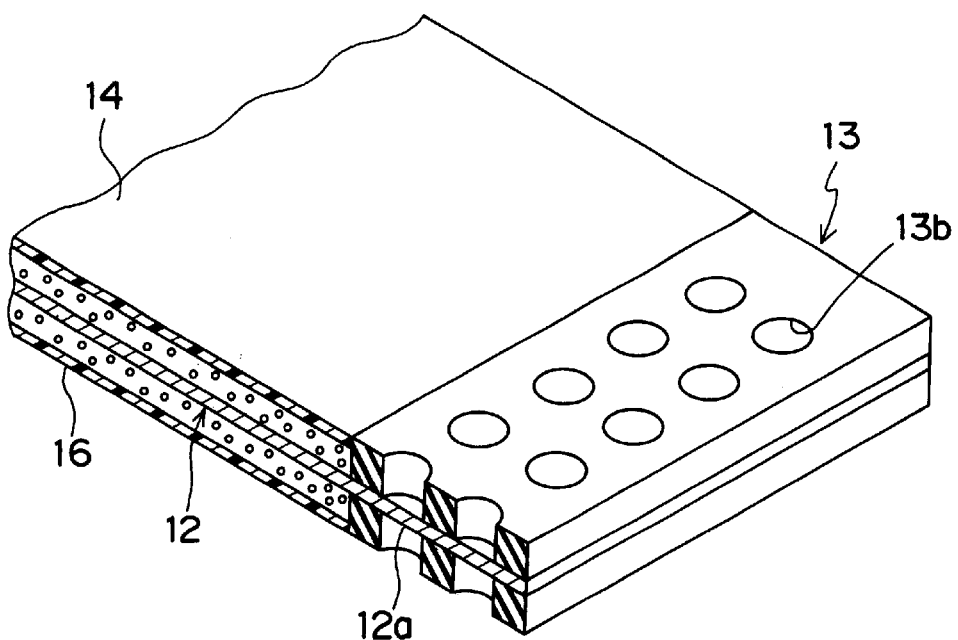
FIG. 9 is a partial perspective view showing still another modification example of the electrophoretic display sheet.

Moreover, the voltage applying section 12a of the conductive substrate 12 is completely exposed in the aforementioned electrophoretic display sheet 10. However, if the voltage applying section is exposed as described above, it is possible that the already displayed image is disordered by accidental voltage application (for example, frictional electric charges and contact with an electrically charged object) to the voltage applying section 12a. Accordingly, in order to prevent the occurrence of the aforementioned situation by avoiding imprudent voltage application to the conductive substrate 12, it is acceptable to provide the voltage applying section 12a of the conductive substrate 12 with an insulating cover 13 made of, for example, a resin or rubber as shown in FIGS. 8 and 9 and form on this insulating cover 13 a thin groove 13a or a small hole (an elongated hole is acceptable) 13b, which reaches the voltage applying section 12a. When this arrangement is adopted, it is preferred that the voltage applying member for applying the voltage to the conductive substrate 12 is constructed of a conductive brush or a conductive roller of which the outer peripheral portion is made of an elastic material. With this arrangement, the tip of the brush or the outer peripheral portion of the roller deformed by pressurization enters the groove 13a or the hole 13b of the insulating cover 13 and comes in contact with the voltage applying section 12a, by which the voltage can be applied to the conductive substrate 12.

Figure 10:
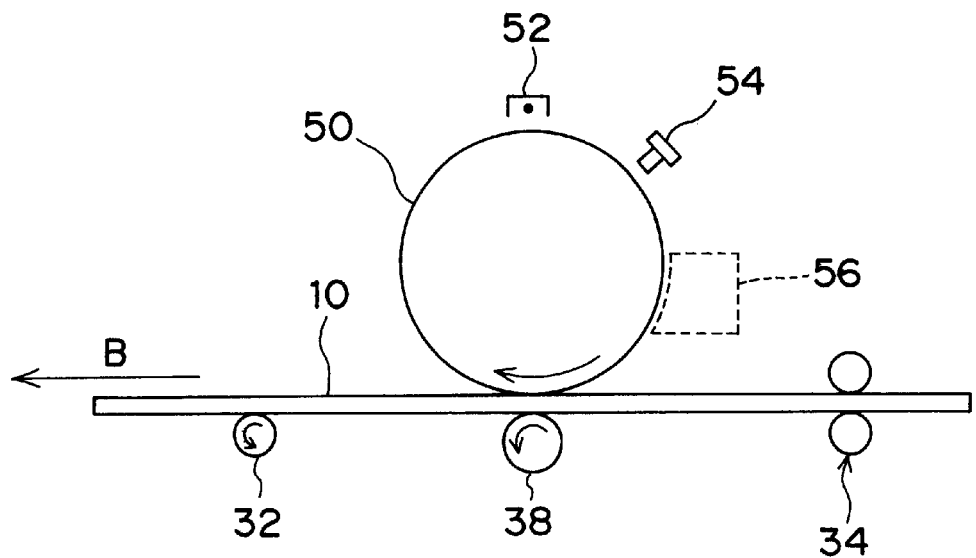
FIG. 10 is a schematic structural view of a modification example of the image forming apparatus.

A modification example of the image forming apparatus will continuously be described. The aforementioned image forming apparatus 30 employs the recording head 36 to which the voltage is applied according to the image signal as an image writing member. However, as shown in FIG. 10, a photoreceptor 50 that carries an electrostatic latent image on its surface may be employed as an image writing member. The electrostatic latent image is formed by uniformly electrically charging the surface of the photoreceptor 50 by means of a charger 52 and thereafter exposing the surface to light by means of an exposure unit 54 according to an image signal. It is to be noted that, if a developer 56 for developing the electrostatic latent image is provided, then there can be provided an image forming apparatus that can cope with a regular paper or the like, not specially for the electrophoretic display sheet.

Figure 11:
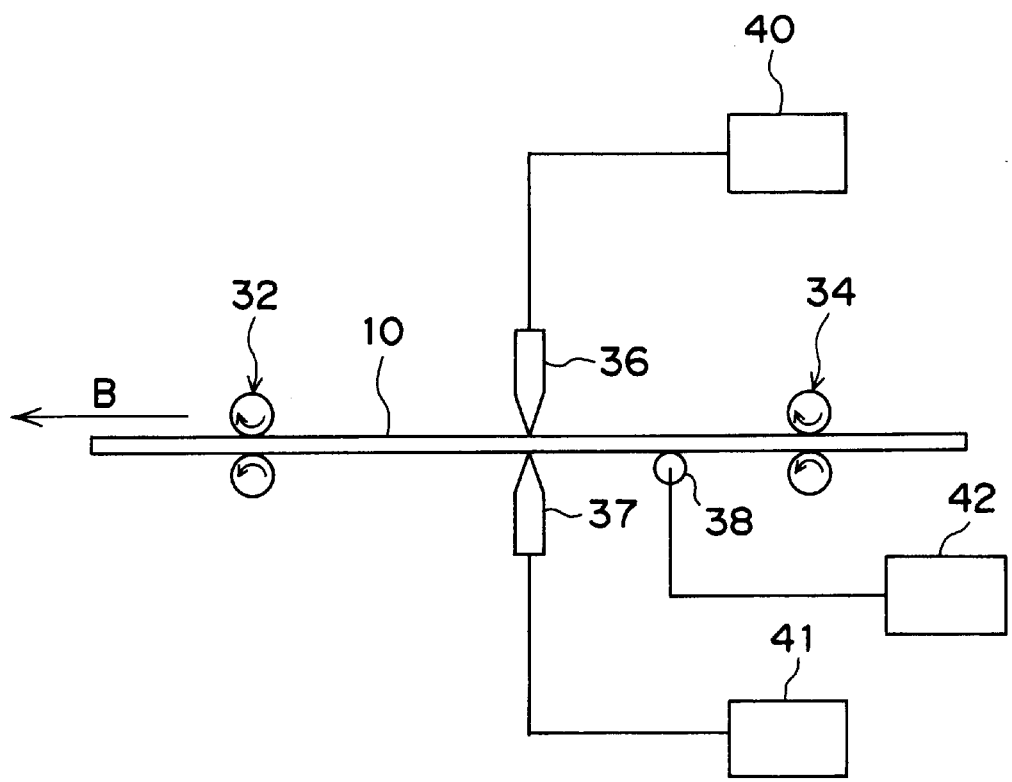
FIG. 11 is a schematic structural view of another modification example of the image forming apparatus.

Moreover, in the aforementioned image forming apparatus 30, the recording head 36, which serves as the image writing member, is provided on one side of the electrophoretic display sheet 10. However, as shown in FIG. 11, two recording heads 36 and 37 may be provided on both sides of the electrophoretic display sheet 10. A voltage is applied to the recording head 37 by a power source 41 according to an image signal. This arrangement enables simultaneous image writing on both surfaces of the electrophoretic display sheet 10. It is to be noted that the positions of the recording heads 36 and 37 are not necessarily opposed to each other and permitted to be away form each other in the sheet conveyance direction (direction of arrow B). Moreover, two photoreceptors may be arranged on both sides of the electrophoretic sheet 10 in place of the recording heads 36 and 37.

Figure 12:
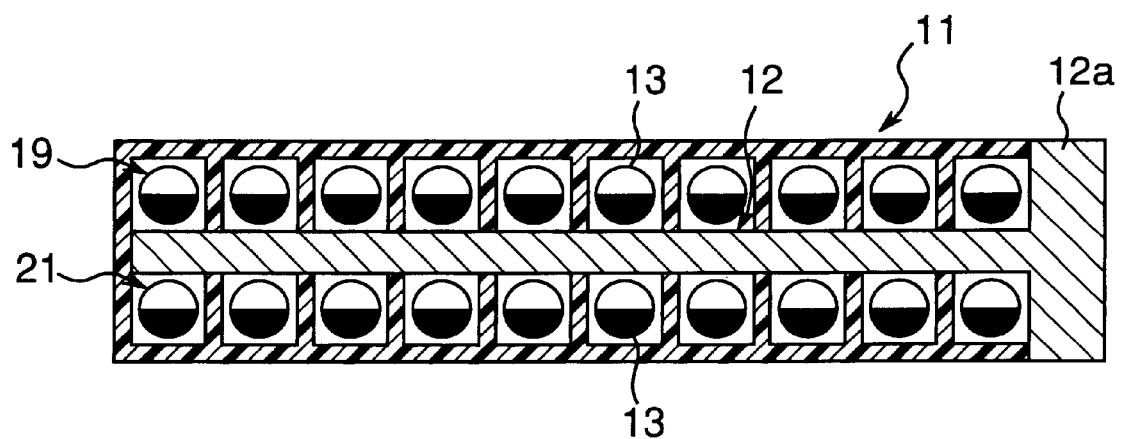
FIG. 12 is a sectional view of a rewritable display sheet of a twist ball system.

The electrophoretic display sheet and the image forming apparatus that employs the display sheet have been described above. However, as shown in FIG. 12, the present invention can also be applied to a rewritable display sheet 11 of the so-called twist ball system such that colored particle layers 19 and 21, which are formed by arranging numbers of colored particles 13 that have at least two surfaces of different charge characteristics and different colors, are provided as display layers. This rewritable display sheet 11 of the so-called twist ball system also is provided with a conductive substrate 12 arranged between the two colored particle layers 19 and 21. Therefore, similarly to the case of the aforementioned electrophoretic display sheet 10, an image can be written by selectively rotating the colored particles 13 with an electric field applied to each of the colored particle layers 19 and 21 according to an image signal, and this enables dual-surface image display to be achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included thereto.

What is claimed is:

1. A rewritable display sheet comprising:
   a conductive substrate having a voltage applying section at an end portion;
   a first display layer, which is provided on a first surface of the conductive substrate and able to display a first image with a first electric field applied thereto;
   a first transparent sheet provided on the first display layer;
   a second display layer, which is provided on a second surface of the conductive substrate and able to display a second image with a second electric field applied thereto; and a second transparent sheet provided on the second display layer.

2. A rewritable display sheet as claimed in claim 1, wherein the first and second display layers are colored particle layers in which numbers of colored particles having two surfaces of different charge characteristics and different colors are arranged.

3. A rewritable display sheet as claimed in claim 1, wherein the first and second display layers are electrophoretic layers in which electrophoretic particles are dispersed in a dispersion medium.

4. A rewritable display sheet as claimed in claim 1, wherein the voltage applying section is arranged while projecting outwardly of the first display layer, the second display layer, the first transparent sheet and the second transparent sheet.

5. A rewritable display sheet as claimed in claim 4, wherein the voltage applying section is arranged on each of adjacent two peripheral portions out of four peripheral portions of the rewritable display sheet.

6. A rewritable display sheet as claimed in claim 4, wherein the voltage applying section is provided with an insulating cover, and the insulating cover is provided with a groove or hole that is formed so as to reach the voltage applying section.

7. An image forming apparatus for displaying an image on a rewritable display sheet,
the rewritable display sheet being constructed of a conductive substrate having a voltage applying section at an end portion, a first display layer, which is provided on a first surface of the conductive substrate and able to display a first image with a first electric field applied thereto, a first transparent sheet provided on the first display layer, a second display layer, which is provided on a second surface of the conductive substrate and able to display a second image with a second electric field applied thereto, and a second transparent sheet provided on the second display layer, and the image forming apparatus comprising:
an image writing member provided so as to be able to come in contact with a surface of the first transparent sheet; and
a voltage applying member provided so as to be able to come in contact with the voltage applying section.

8. An image forming apparatus as claimed in claim 7, further comprising another image writing member provided so as to be able to come in contact with a surface of the second transparent sheet.

9. An image forming apparatus as claimed in claim 7, wherein the image writing member is a recording head that has a number of electrodes to which a voltage is applied according to an image signal.

10. An image forming apparatus as claimed in claim 7, wherein the image writing member is a photoreceptor that carries an electrostatic latent image on its surface.

11. An image forming apparatus as claimed in claim 7, wherein the voltage applying member is a conductive roller.

12. An image forming apparatus as claimed in claim 11, wherein an outer peripheral portion of the conductive roller is formed of an elastic material.

13. An image forming apparatus as claimed in claim 7, wherein the voltage applying member is a conductive brush.

14. An image forming apparatus as claimed in claim 7, wherein the first and second display layers are colored particle layers in which numbers of colored particles having two surfaces of different charge characteristics and different colors are arranged.

15. An image forming apparatus as claimed in claim 7, wherein the first and second display layers are electrophoretic layers in which electrophoretic particles are dispersed in a dispersion medium.

16. An image forming apparatus as claimed in claim 7, wherein the voltage applying section is arranged while projecting outwardly of the first display layer, the second display layer, the first transparent sheet and the second transparent sheet.

17. An image forming apparatus as claimed in claim 16, wherein the voltage applying section is arranged on each of adjacent two peripheral portions out of four peripheral portions of the rewritable display sheet.

18. An image forming apparatus as claimed in claim 16, wherein the voltage applying section is provided with an insulating cover, and the insulating cover is provided with a groove or hole that is formed so as to reach the voltage applying section.

19. An image displaying method for displaying an image on a rewritable display sheet, comprising the step of:
applying a second voltage to a surface of a first transparent sheet according to an image signal in a state in which a first voltage is applied to a voltage applying section of the rewritable display sheet constructed of a conductive substrate having the voltage applying section at an end portion, a first display layer, which is provided on a first surface of the conductive substrate, the first transparent sheet provided on the first display layer, a second display layer, which is provided on a second surface of the conductive substrate, and a second transparent sheet provided on the second display layer, whereby a first image is displayed on the first display layer.

20. An image displaying method as claimed in claim 19, wherein, in a state in which the first voltage is applied to the voltage applying section of the rewritable display sheet that is displaying the first image on the first display layer, a third voltage is applied to a surface of the second transparent sheet according to an image signal, whereby a second image is displayed on the second display layer.

* * * * *